(12) United States Patent
Sarh et al.

(10) Patent No.: US 7,937,817 B2
(45) Date of Patent: May 10, 2011

(54) METHODS AND APPARATUS FOR AN INSTRUMENTED FASTENER

(75) Inventors: Branko Sarh, Huntington Beach, CA (US); Harry Asada, Lincoln, MA (US)

(73) Assignee: The Boeing Company, Chicago, IL (US)

( * ) Notice: Subject to any disclaimer, the term of this patent is extended or adjusted under 35 U.S.C. 154(b) by 1013 days.

(21) Appl. No.: 11/756,447

(22) Filed: May 31, 2007

(65) Prior Publication Data
US 2008/0295314 A1 Dec. 4, 2008

(51) Int. Cl.
*B21D 53/88* (2006.01)

(52) U.S. Cl. ............... 29/407.1; 29/897.2; 29/407.09; 356/620; 356/622; 398/151; 33/276; 33/286

(58) Field of Classification Search ........... 29/897.2, 29/407.09, 407.1, 407.04, 525.11, 559; 356/614–616, 620–622; 398/131, 151, 165, 398/172; 33/276, 286; 702/94; 362/553
See application file for complete search history.

(56) References Cited

U.S. PATENT DOCUMENTS

| | | | |
|---|---|---|---|
| 2,206,036 A * | 7/1940 | Herson ............... | 356/4.06 |
| 4,277,170 A * | 7/1981 | Miles ................. | 356/141.3 |
| 4,934,885 A | 6/1990 | Woods et al. | |
| 5,202,568 A * | 4/1993 | Woods ............... | 250/559.12 |
| 5,549,803 A | 8/1996 | Schoess et al. | |
| 5,577,829 A | 11/1996 | Hall | |
| 5,757,499 A * | 5/1998 | Eaton ............... | 356/620 |
| 6,056,283 A | 5/2000 | Gage et al. | |
| 6,196,779 B1 | 3/2001 | Falk | |
| 6,611,346 B2 * | 8/2003 | Granger ............ | 356/620 |
| 6,643,019 B1 * | 11/2003 | Jeanneret .......... | 356/399 |
| 6,741,364 B2 * | 5/2004 | Lange et al. ...... | 356/622 |
| 7,124,513 B2 * | 10/2006 | Chen et al. ........ | 33/286 |
| 7,216,436 B2 * | 5/2007 | Whitworth et al. | 33/286 |
| 7,557,936 B2 * | 7/2009 | Dickinson .......... | 356/620 |
| 2001/0024283 A1 * | 9/2001 | Granger ............ | 356/620 |
| 2003/0038933 A1 * | 2/2003 | Shirley et al. .... | 356/243.1 |
| 2007/0262933 A1 * | 11/2007 | Streitz ............... | 345/82 |

* cited by examiner

*Primary Examiner* — David P Bryant
*Assistant Examiner* — Ryan J Walters

(57) ABSTRACT

An instrumented fastener (e.g., a "tack" fastener) includes one or more light sources (e.g., light-emitting diodes) configured to produce a light beacon that includes encoded information regarding the instrumented fastener (e.g., part number), wherein the direction of the light beacon can be used to align external and/or internal assembly systems to the instrumented fasteners. The light beacon may be activated automatically, or via an instruction received from an external system. Once aligned, the assembly system may, for example, proceed with installing permanent fasteners between neighboring tack fasteners.

7 Claims, 3 Drawing Sheets

METHODS AND APPARATUS FOR AN INSTRUMENTED FASTENER

TECHNICAL FIELD

The embodiments described herein generally relate to assembly and testing of structures, and more particularly relate to methods and apparatus for providing information regarding location and orientation of an assembly system with respect to such structures using intelligent fasteners.

BACKGROUND

During the assembly of aircraft airframe structures and other such box-type structures—in which one portion of an assembly system operates on the outside of the structure and another portion of the assembly system operates on the inside of the structure—it is desirable for the various components of the assembly system to be accurately positioned and aligned, facilitating the synchronous performance of assembly tasks. Such tasks include, for example, installing rivets and other fasteners, tasks that may be accomplished manually or through the use of automated assembly systems.

In automated assembly systems, detailed information regarding the location and orientation of the assembly system and its various end-effectors with respect to the structure is preferably generated and maintained. One common method of addressing this positioning problem involves coordinating the position of the internal and external assembly system using "tack" fasteners, which are installed at structural interfaces to stabilize components during assembly. The location of these fasteners can be detected by both the internal and external portions of the assembly system using conventional vision system cameras.

Another common technique involves the use of a small magnet, which can be placed inside a hole of the internal structural component, along with a magnet centroid finder that is moved along the outer surface until the center (i.e., the magnet) is located. An "X" or other such indicia is then marked on the surface, which is then identified by a vision system camera on the external portion of the assembly unit.

Such systems, however, are somewhat imprecise and generally provide only two-dimensional guidance (e.g., x and y position). Furthermore, such passive tacks are not configured to identify the specific structural location in which they are placed.

Accordingly, it is desirable to provide improved fasteners and aligning methods for such fasteners during joining and testing operations. Other desirable features and characteristics of the various embodiments will become apparent from the subsequent detailed description and the appended claims, taken in conjunction with the accompanying drawings and the foregoing technical field and background.

BRIEF SUMMARY

Methods and apparatus are provided for improved assembly methods using intelligent fasteners. In one embodiment, an instrumented fastener (e.g., a "tack" fastener) includes one or more light sources (e.g., light-emitting diodes) configured to produce a light beacon that encodes information regarding the instrumented fastener (e.g., part number), wherein the direction of the light beacon can be used to align external and/or internal assembly systems to the instrumented fastener. The light beacon may be activated automatically, or via an instruction received from an external system. In the context of aircraft assembly, a plurality of such fasteners may be affixed to one or more airframe parts and used to autonomously assemble the various structures.

BRIEF DESCRIPTION OF THE DRAWINGS

Various embodiments will hereinafter be described in conjunction with the following drawing figures, wherein like numerals denote like elements.

DETAILED DESCRIPTION

Figure 1:
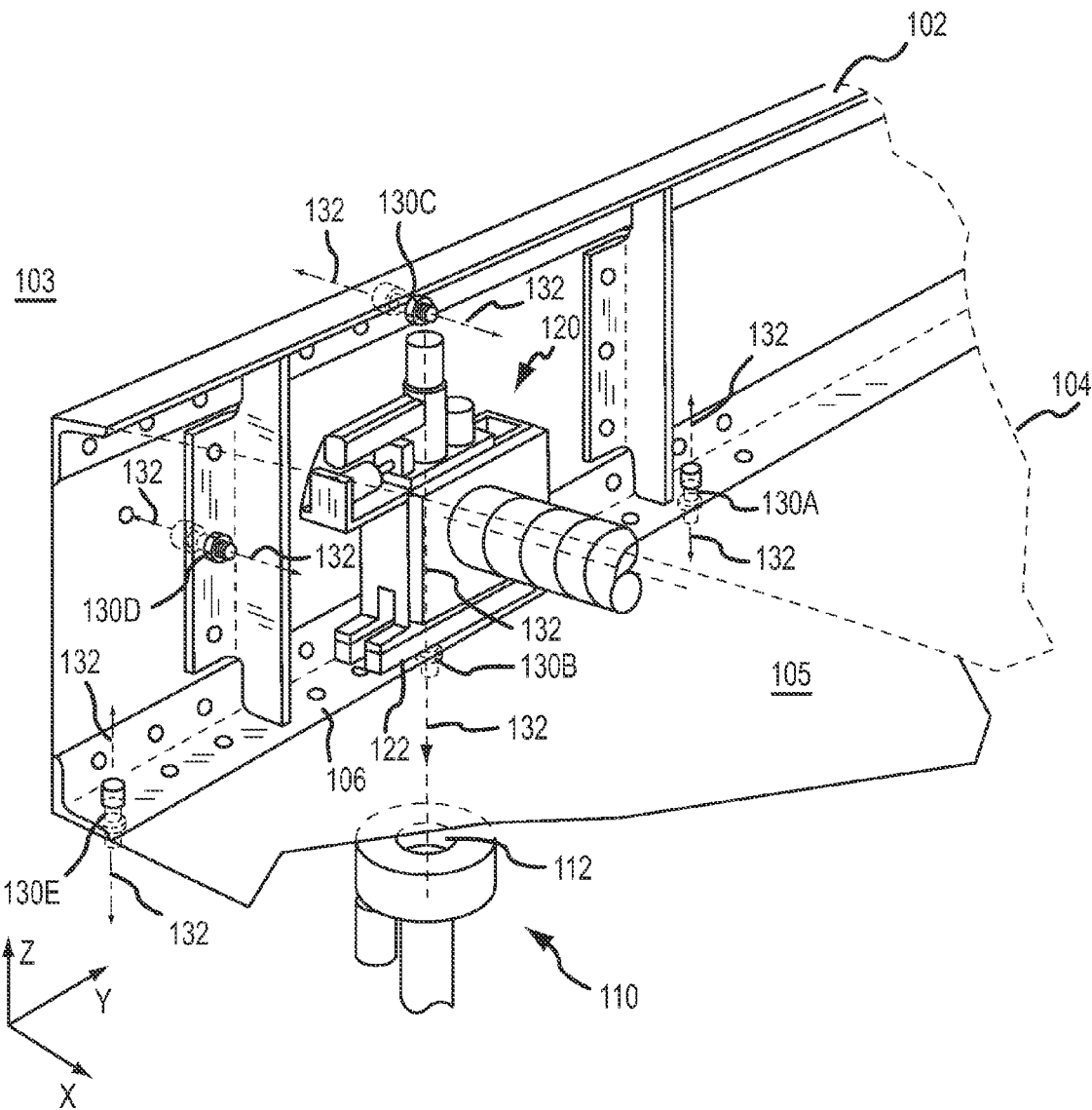
FIG. 1 is an isometric partial cut-away view of an assembly useful in describing various embodiments.

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

For simplicity and clarity of illustration, the drawing figures depict the general structure and/or manner of construction of the various embodiments. Descriptions and details of well-known features and techniques may be omitted to avoid unnecessarily obscuring other features. Elements in the drawings figures are not necessarily drawn to scale: the dimensions of some features may be exaggerated relative to other elements to improve understanding of the example embodiments.

Terms of enumeration such as "first," "second," "third," and the like may be used for distinguishing between similar elements and not necessarily for describing a particular spatial or chronological order. These terms, so used, are interchangeable under appropriate circumstances. The embodiments described herein are, for example, capable of use in sequences other than those illustrated or otherwise described herein. Unless expressly stated otherwise, "connected" means that one element/node/feature is directly joined to (or directly communicates with) another element/node/feature, but not necessarily mechanically. Likewise, unless expressly stated otherwise, "coupled" means that one element/node/feature is directly or indirectly joined to (or directly or indirectly communicates with) another element/node/feature, but not necessarily mechanically.

The terms "comprise," "include," "have" and any variations thereof are used synonymously to denote non-exclusive inclusion. The terms "left," "right," "in," "out," "front," "back," "up," "down," and other such directional terms are used to describe relative positions, not necessarily absolute positions in space. The term "exemplary" is used in the sense of "example," rather than "ideal."

In the interest of conciseness, conventional techniques, structures, and principles known by those skilled in the art may not be described herein, including, for example, conventional structural design, basic principles of electronics, light sources, LEDs, sensors, and the like.

In general, the various embodiments described herein relate to a form of intelligent fastener that assists with guiding an assembly system into proper position and alignment. More particularly, referring to FIG. 1, an exemplary assembly task involves the joining of one or more components of a structure 102. In this figure, a "skin" 104 of the box-type structure is shown in dotted lines, and generally defines an interior region 105 and exterior region 103. It will be understood that the particular beams, holes, and other components shown in FIG. 1 are merely examples, and in no way limits the range of applicable embodiments.

Two portions of an assembly system are illustrated in FIG. 1: an external portion 110, and an internal portion 120. For ease of reference, these two systems may be referred to herein as "external assembly system" 110 and "internal assembly system" 120, respectively, even though in practice they may be independent systems or two parts of the same system. Each assembly system 110 will typically include various end-effectors, actuators, and/or tools configured to perform the task at hand, and will also typically be attached to a robotic device and associated computer system (not shown in FIG. 1).

A number of instrumented fasteners (or simply "fasteners") 130 have been attached to structure 102 at various points. In the illustrated embodiment, five such fasteners (130A, 130B, 130C, 130D, and 130E) are shown. In order to illustrate operation of the various embodiments, it is assumed that these fasteners 130 are "tack" fasteners—i.e., fasteners that help stabilize structure 102 temporarily, and which are replaced with a second, likely stronger, more permanent type of fastener, and which help with installing such permanent type fasteners in adjacent holes. Alternatively, fasteners 130 may be permanent fasteners.

It is desirable for internal assembly system 120 and external assembly system 110 to work synchronously to locate each fastener 130 and align themselves correctly such that any subsequent processing can be precisely performed—e.g., between two adjacent or neighboring tag fasteners. The scenario illustrated in FIG. 1 shows internal assembly system 120 located above fastener 130B, and external assembly system 110 located below fastener 130B.

To achieve this alignment, and as described in further detail below, each fastener 130 is configured to produce one or more light beacons 132 that can be sensed by assembly systems 110 and 120. This light beacon, in addition to providing a reference for alignment, may also include encoded information (encoded by controller 230) regarding the nature and/or location of the respective fastener 130. In the illustrated embodiment, for example, fasteners 130, when activated, produce antipodal light beacons projecting outward along their major axes.

When moving into position, external assembly system 110 receives beacon 132 through a port or lens 112. At the same time, internal assembly system 120 receives the antipodal beacon 132 within a sensor along underside 122 of the structure (not shown). Assembly systems 120 may then iteratively move themselves into the correct position and alignment based on the location of the received light on the sensor (i.e., aligned with the z axis as defined in this figure). That is, known techniques may be used to align the sensor such that it is centered and exhibits normality with respect to beacon 132.

Once in the correct position and orientation, assembly systems 110 and 120 may then complete the required task before moving on to the next position (e.g., the next fastener 130). For example, the position of known fastener locations between neighboring fasteners 130 may be computed, followed by installation of permanent fasteners therein.

Figure 2:
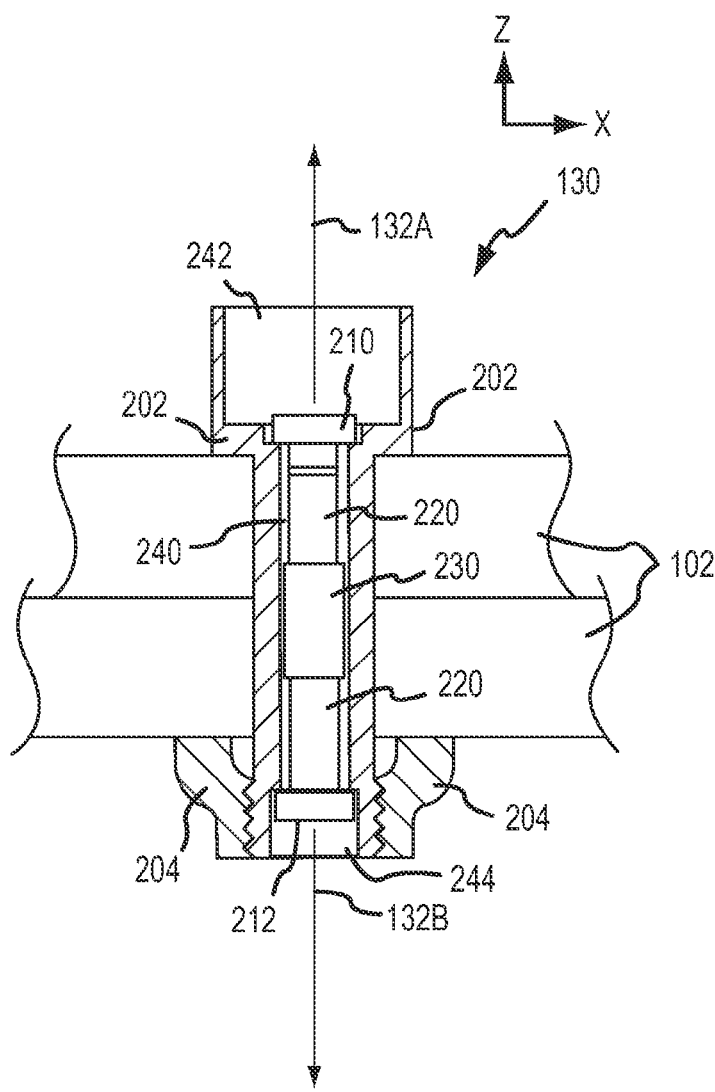
FIG. 2 is a conceptual cross-section view of an instrumented fastener in accordance with an exemplary embodiment.

Referring to FIG. 2, an exemplary instrumented fastener 130 will now be described. In this embodiment, fastener 130 includes a body 202 encasing a light source 210, another light source 212, one or more power sources 220, and a controller 230. Body 202, which has a major axis corresponding in this figure to the z-axis, may include a generally hollow, cylindrical cavity 240 large enough to fit the power source(s) 220 and controller 230. Body 202 may be threaded as shown to receive a corresponding nut 204, thus securing the components of structure 102.

Body 202 may comprise any suitable material or combination of materials, including various plastics, ceramics, metals, and composites. Furthermore, body 202 may have any configuration and size, and is not limited to the tack fastener shown in FIG. 2. In one embodiment, body 202 is generally cylindrical and has a diameter between approximately 0.15-0.50 inches Light sources 210 and 212 are oriented such that, when activated by controller 230, and powered by power source 220, they produce opposing beacons 132A and 132B, respectively, which have maximum intensity in antipodal directions. External cavities 242 and 244 are shown adjacent to light sources 210 and 212, and function to protect light sources 210 and 212 from external impact and other forces.

Light sources 210 and 212 may comprise any suitable light-emitting component, for example, a conventional light-emitting diode (LED). Furthermore, other parts of the electromagnetic spectrum other than visible light may be used. Power source 220 may include one or more batteries, such as various small conventional lithium-ion batteries known in the art.

Figure 3:
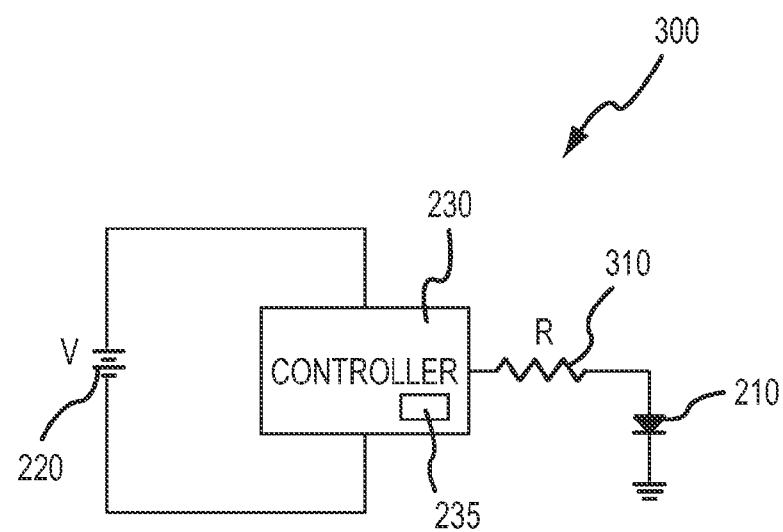
FIG. 3 is a schematic block diagram of an exemplary instrumented fastener.

FIG. 3 shows a simplified block diagram of instrumented fastener 130. Controller 230, which receives a suitable voltage V from power source 220, selectively provides a current through resistor 310 to LED 210. Controller 230 may include any combination of hardware, software, and firmware configured to suitably control light sources 210 and 212. Thus, controller 230 may include a microprocessor, memory, I/O as is conventionally known. Controller 230 (or other components provided within body 202) may also be configured to receive external commands through, for example, a wireless communication protocol.

Controller 230 may activate light sources 210 and 212 periodically, at predetermined times, or in response to an external instruction or stimulus. That is, assembly systems 110 and/or 120 (or the computer systems attached thereto) may be configured to wirelessly issue an instruction to controller 230 such that controller 230 activates the light sources only when the assembly systems are proximate to the fastener 130. Alternatively, controller 230 may sense the presence of the assembly system (e.g., via a conventional passive or active RFID scheme) and activate the light sources only when the assembly system is within a predetermined distance of fastener 130.

Furthermore, as mentioned above, it is desirable for beacons 132 to encode information relating to the nature and/or position of fastener 130. Accordingly, certain data 235 is preferably stored within controller 230 a priori. This data may include information regarding, for example, the part ID of fastener 130, its intended location within the structure (i.e., the particular airframe structure to which it is affixed), or any other such information. The data may be encoded and communicated in any desired manner. In one embodiment, for example, the data is stored as a digital word, and is communicated as a serial bit stream within beacon 132 by modulating the intensity of the beacon at a suitable clock rate. This modulation of intensity can then be read by sensors incorporated into the end-effectors of the assembly systems.

Figure 4:
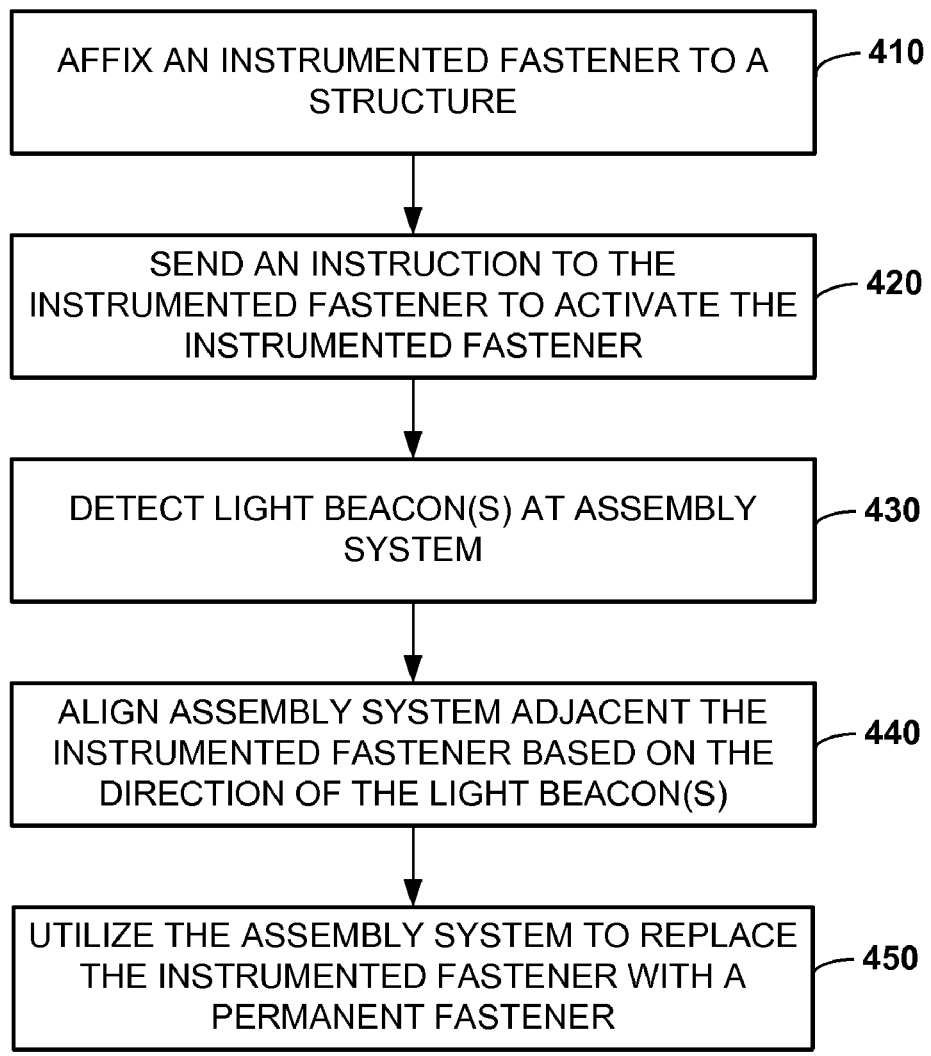
FIG. 4 is an illustration of a method of using an exemplary instrumented fastener.

Referring to FIG. 4, a method of using an exemplary instrumented fastener to align an assembly system includes affixing an instrumented fastener to a structure (block 410), sending an instruction to the instrumented fastener to activate the instrumented fastener (block 420). When activated, the instrumented fastener produces a first light beacon along a first direction. The first light beacon may include information regarding the instrumented fastener. The instrumented fastener may also produce a second light beacon along a second direction antipodal to the first direction.

The light beacon(s) are detected at the assembly system (block 430). The assembly system is aligned adjacent the instrumented fastener based on the direction of the light beacon(s) (block 440). For example, an external portion of the assembly system is aligned based on the first direction of the first light beacon, and an internal portion of the assembly system is aligned based on the second direction of the second light beacon. In some embodiments, aligning the external portion of the assembly system includes alignment of an end-effector exhibiting four degrees of freedom. In some embodiments, aligning the external portion of the assembly system includes determining a part number of the instrumented fastener based on the information included in the first light beacon.

The method may further include utilizing the assembly system to replace the instrumented fastener with a permanent fastener (block 460).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The invention claimed is:

1. A method of aligning an assembly system, the method comprising:
   affixing an instrumented fastener to a structure, the instrumented fastener configured to produce, when activated, a first light beacon along a first direction and a second light beacon along a second direction antipodal to the first direction, wherein the first light beacon includes information regarding the instrumented fastener;
   detecting, at an assembly system, the first light beacon;
   aligning an external portion of the assembly system adjacent the instrumented fastener based on the direction of the first light beacon; and aligning an internal portion of the assembly system based on the second direction of the second light beacon.

2. The method of claim 1, further including, after the aligning step, utilizing the assembly system to replace the instrumented fastener with a permanent fastener.

3. The method of claim 1, further including:
   sending an instruction to the instrumented fastener; and
   activating the instrumented fastener in response to the instruction.

4. A method for assembling an aircraft, the method comprising:
   affixing an instrumented fastener to an airframe structure of the aircraft, the instrumented fastener configured to produce, when activated, a first light beacon along a first direction, and a second light beacon along a second direction antipodal to the first direction, wherein the first and second light beacons include information regarding the instrumented fastener;
   detecting, at an external portion of an assembly system, the first light beacon;
   detecting, at an internal portion of the assembly system, the second light beacon;
   aligning the external portion of the assembly system adjacent the instrumented fastener based on the first direction of the first light beacon; and
   aligning the internal portion of the assembly system adjacent the instrumented based on the second direction of the second light beacon.

5. The method of claim 4, further including, after the aligning step, utilizing the external and internal portions of the assembly system to replace the instrumented fastener with a permanent fastener.

6. The method of claim 4, further including:
   sending an instruction to the instrumented fastener; and
   activating the instrumented fastener in response to the instruction.

7. The method of claim 4, wherein aligning the external portion of the assembly system includes determining a part number of the instrumented fastener based on the information included in the first light beacon.

* * * * *